April 24, 1928.  W. HAHNEMANN ET AL  1,667,418

SUBAQUEOUS SOUND SIGNALING APPARATUS

Filed Feb. 4, 1921

Inventors
Walter Hahnemann and
Alard du Bois-Reymond
by Knight Bro.
Attorneys

Patented Apr. 24, 1928.

1,667,418

UNITED STATES PATENT OFFICE.

WALTER HAHNEMANN, OF KITZEBERG, NEAR KIEL, AND ALARD DU BOIS-REYMOND, OF PLON, NEAR KIEL, GERMANY, ASSIGNORS TO THE FIRM SIGNAL GESELLSCHAFT, M. B. H., OF KIEL, GERMANY.

SUBAQUEOUS SOUND-SIGNALING APPARATUS.

Application filed February 4, 1921, Serial No. 442,583, and in Germany November 29, 1915.

In sound signaling apparatus, particularly in such as are used for sending out and receiving submarine sound signals of a certain definite pitch, it is an almost general practice to employ so-called tuned vibratory structures, i. e. such as are capable, on account of their mass and elastic force, of executing vibrations of a certain duration and damping. Their time of vibration or frequency is made to correspond more or less accurately to the note that is to be sent out or received by the apparatus in question. Elements which are to be regarded as such vibratory structures are for example the diaphragm which serves to receive or send out sound waves, or the sound producer or detector proper (especially in cases in which these devices possess considerable mass and elastic members whose elastic force is well defined), or finally structures of a special kind such as tuning forks, rings, mushroom-like structures or the like which are mostly interposed between the radiating diaphragm and the actual sound producing or detecting member of the apparatus for the purpose of obtaining a transformation of the amplitudes of the waves received or sent out.

All structures or bodies of this kind, since they act as independently vibratory structures, are capable, when once excited, as by a blow or in any other manner, of maintaining their natural rate of vibration for a shorter or longer interval of time. The time it takes for these vibrations to die away depends on the degree to which the particular structure is damped. If this time is too long i. e. if the damping is too small, this will give rise to numerous disadvantages. In receiving devices, in which these vibratory structures are tuned to the note that they are intended to receive, the arriving signals will be drowned in the slowly fading disturbing notes which may have been produced by extraneous noises or disturbances, so that a proper reception of the signals becomes impossible. Another result of the small damping, which is the equivalent of what is called sharp tuning, is that such apparatus only enable one particular note to be heard loudly, whilst they only faintly reproduce other sounds even if these sounds are almost similar to the said note. This is particularly annoying in cases where one and the same signaling plant is employed for detecting sounds that differ more or less from each other, as in navigating with submerged bells, which give different notes. In an insufficiently damped sound producer there will be a constant risk that even slight deviations from the proper frequency of the exciting force, which, in the case of an electromagnetically excited sound producer, might arise through the alternating current dynamo running a little too slow or too fast, will put the producer out of tune, when it will, of course, send out a very feeble sound.

It follows from the foregoing remarks that for the proper operation of sound signaling apparatus a relatively large damping of their vibratory structures is necessary. We have discovered by exhaustive experimental and theoretical investigations that it is possible to avoid disturbances of the kind mentioned in the preceding paragraph by damping the signaling apparatus to such an extent that on being subjected to undesired extraneous disturbances it is prevented from giving an audible sound. These undesired extraneous disturbances occur normally, and are produced by local conditions in the water, machinery on a ship, etc.

We have found from practical investigation that sound signaling apparatus or the vibratory structure or structures by which the frequency of its sound vibrations is determined, must have a damping decrement amounting to 0.3 at the least.

In order to obtain so large a damping in the apparatus a corresponding increase of each of the three important kinds of damping in the apparatus may be brought about. These three kinds of damping are: the useful damping, the damping of radiation, and the waste or deleterious damping. In sound senders the useful damping and damping of radiation are identical.

The most advantageous arrangement is, of course, one in which so much usefully employed energy is extracted from the vibrating apparatus that this energy alone gives rise to the desired amount of damping. This can be accomplished in sound receiving apparatus by the sound detector being arranged to convert the necessary amount of energy into a form that is perceptible to the operator, and in senders or sound producers the desired effect may be achieved by causing the necessary amount of energy to be radiated into the propagating medium. In both of these cases it is the useful damping alone that is augmented. In receiving apparatus it is often technically impossible (because of the construction of the microphone etc.) to sufficiently augment the useful damping. But this obstacle may be overcome by augmenting the so-called damping of radiation, i. e. by making the amount of energy, which the actual sound-collecting member (the diaphragm) in oscillating to and fro reflects back into the sound propagating medium (the water), large enough. This may be accomplished by using a diaphragm of considerable size, that is, of large diameter. The size useful for this purpose would be larger than that of the diaphragms which have been employed hitherto in the construction of receivers for submarine sound signals. The damping of radiation may be further increased by in addition forming the large diaphragm of a metal of low specific weight.

Another means of achieving the large damping necessary to obtain very short trains of vibrations of the vibrating members of the sound signaling apparatus consists in employing deleterious damping. But this means is preferably only employed if the results obtained by the afore-described measures are not satisfactory, for it is obvious that any extraction of energy which is not used for sending out or receiving sound represents wasted energy. In practice, however, it will not always be possible to avoid the application of this means. The application of deleterious damping is comparatively unobjectionable in cases where the vibrations which produce the disturbing trains are not those whose frequency coincide with that of the signal note, but vibrations of other frequencies such as harmonics, etc. which the particular vibratory structures are also capable of executing. This means is often resorted to. But in all known devices developed along these lines the mistake has been made to attach the damping devices to the vibratory structure to be damped on the one hand, and on the other hand to a fixed holding member. But this mode of procedure is objectionable because in such arrangements the pressure of the damping members puts the vibratory structures out of tune. Therefore in such cases the deleterious damping is produced in accordance with the invention by attaching the damping devices to suitable parts of the vibratory structure only, whilst in all other respects they are freely suspended in space. This applies in cases in which mechanical damping means are employed consisting of solid bodies.

Another way of producing a deleterious damping consists in exerting a damping effect on a part of the medium (water, air) to which the vibratory structure imparts movements that are coordinate to its own. This is preferably done by impeding the movements of the said medium. A simple practical means for impeding these movements consists in compelling the medium to pass through narrow openings or passages.

Thirdly, electromagnetic damping devices may be employed, particularly such in which the vibratory motion of the structure or body to be damped is caused to produce alternating currents in a short-circuited winding arranged in a magnetic field.

Constructional forms of the invention are illustrated in the drawing in which

Figure 1:
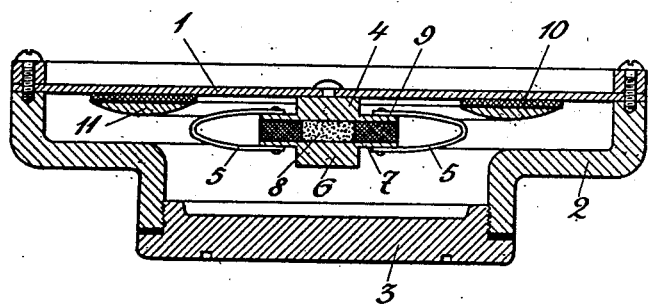
Fig. 1 illustrates a sound receiver equipped with a microphone, and in which the large damping required is obtained by employing an unusually large radiating member and by damping cushions freely suspended on the vibratory structure.

The apparatus shown in Fig. 1 comprises a vibrating diaphragm 1 which closes the casing 2 to the sound-propagating medium. At the other side the casing is closed by a cover 3. Attached to the diaphragm is a metallic body 4 to which in turn a second similar body 6 is connected by means of elastic bows 5. Both of the said bodies have flanges 7 and the middle parts of their confronting surfaces are shaped so as to form the electrodes of a microphone 8. The margins of the flanges serve as members for receiving a sandwiched damping ring 9 composed of a material such as rubber which possesses great internal friction. Another damping ring 10 is carried by the diaphragm 1 upon which a ring 11 is placed consisting of a material of great specific weight, such as a heavy metal. The middle space 8 between the masses 4 and 6 is filled with powdered carbon.

In this apparatus the exceedingly large surface of the diaphragm 1 gives rise to the radiation or reflection of a comparatively very considerable amount of energy back into the medium when the diaphragm vibrates. By forming the electrodes of the microphones of heavy bodies, the advantage is gained that a very considerable quantity of powdered carbon is affected by the vibrations of these bodies towards and away from each other. Of the energy of vibration existing in the diaphragm an exceedingly large proportion can thus be sent in a useful form to the operator's station. It will be apparent that either the one or the other of these methods may be adopted both in such receivers and in sound producers. It has been found in practice that when microphones are employed it is difficult to obtain the large damping required by merely constructing the microphone in a certain way and by selecting suitable dimensions of its parts. The preferred procedure is to ignore the question of damping in designing the microphone and to direct attention chiefly to the production of a large damping of radiation.

The way in which the damping cushion 9 between the flanges and the microphone electrodes acts will be obvious. By this cushion energy is extracted from the vibratory structure composed of the masses 4 and 6 and the elastic bows 5, and this energy is of a form that cannot be employed for any useful purpose. The damping ring 10 on the diaphragm operates in a similar manner. If a ring of this kind were simply attached to the diaphragm, and no auxiliary means were employed, it might happen that the ring is merely moved to and fro by the diaphragm without its form being changed. But as its damping qualities only become effective when its form is altered, provision must be made for compressing the ring when vibrations occur. This is accomplished by superposing a heavy mass 11 on the free surface of the coating 10. But this mass must not bear against a fixed abutment, for this would change the tuning of the diaphragm. Fig. 1 also includes a representation of deleterious damping means by which it is shown that such means may be employed for damping vibrations whose frequency coincides with that of the signaling note, as well as for concomitant and harmonic notes. The vibratory structure, 4, 5, 6, when excited by the diaphragm, executes oscillations of a kind that causes the parts 4, 6 to move in a direction at right angles to the surface of the diaphragm, and in mutually opposite directions to each other. Oscillations in this direction also produce the greatest deformation of the damping ring 9. The oscillations just described are those whose rate of vibration or frequency coincides with that of the note to be received. But it will be obvious that the mass 6, if struck laterally, is also capable of moving parallel to the surface of the diaphragm. When the mass is moved thus, it will not be so much a change of volume as an alteration of the form of the ring that takes place. The ring will also exert a damping effect on vibrations corresponding to movements of this kind, but its effect will not be as great as when damping the principal vibrations. The ring 10 exerts its entire damping effect upon vibrations which do not coincide with the note used for signaling, these vibrations being the harmonic oscillations of the diaphragm that give rise to ring shaped wave crests and hollows at the middle of the cushion 10. Thus this ring-shaped harmonic oscillates in a direction at right angles to the surface of the damping ring and its principal effect is that of changing the volume of the ring by varying its thickness. By covering more and more of the surface of the diaphragm with the damping layer 10 it is possible at last to damp all of the harmonics, and also the fundamental vibrations of the diaphragm whose pitch corresponds to that of the signaling note used, this damping amounting to a deleterious extraction of energy, i. e. to extracting energy that is dissipated and not rendered audible.

Figure 2:
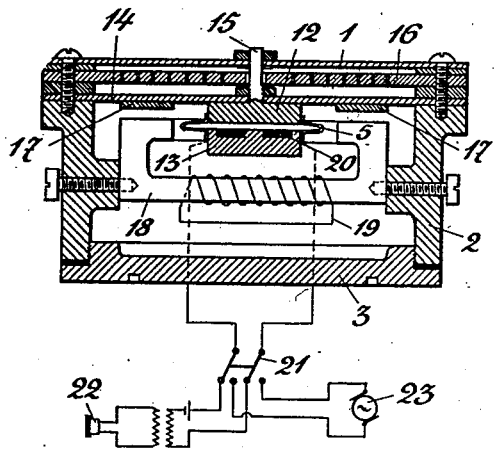
Fig. 2 shows an apparatus adapted for receiving and transmitting (i. e. sending out) sound waves in which the damping effect is produced electromagnetically and by impeding the motion of the medium moved by the diaphragm of the apparatus.

In Fig. 2 the microphone 4, 6, 8 of Fig. 1 is substituted by an electromagnet consisting of an armature 12 and a coil 20 embedded in the field iron 13. In addition to the outer diaphragm 1 this apparatus is equipped with a second diaphragm 14 rigidly connected to the first by a bolt 15 and which is thus compelled to participate in the movements of the diaphragm 1. Arranged in the space between these diaphragms is a plate 16 provided with fine perforations. Instead of the damping ring 10 shown in Fig. 1 the diaphragm 14 carries small iron plates 17 placed opposite to the poles of a magnet 18. The coil 19 mounted on magnet 18 and in which this magnet induces currents is short-circuited. The coil 20 belonging to the magnetic core 13 may be connected at will to a telephone receiver 22 or to an alternating current generator 23 by a circuit changer 21.

The described apparatus operates in the following manner:

When the coil 20 is connected to the alternator the magnetizations of the core 13 will cause the armature 12 and the iron core 13 to alternately approach and recede from each other at a rapid rate and thus vibrations of the diaphragms 1 and 14 will be caused by the armature 12.

When the coil 20 is connected to the telephone receiver 22 alternating currents induced in coil 20 through vibrations of the diaphragms due to incoming sound waves will produce audible signals in the telephone receiver, so that the apparatus will then act as a sound signal receiver.

The damping is produced by a suitable fluid medium enclosed between the diaphragms 1 and 14 which is caused to flow through the narrow passages in the plate 16. When the diaphragm 1 is moved inward the space between it and the plate 16 is diminished, whilst the space between 16 and 14 is enlarged. Hence the medium contained in the enclosed space is forced from one side of the plate 16 through the narrow passages to the other side of the plate, and the energy of which the apparatus is to be deprived is destroyed by the considerable friction caused in the narrow passages. The second damping means consists of the electromagnet 17, 18. By the movements of the iron pieces 17 caused by the vibrations of the diaphragms, alternating currents are induced in coil 19 which generate heat in this short-circuited coil.

It will be obvious that in devices of this kind several sieve-like plates 16 instead of one only may be employed. If the damping to be produced by this method is very great, the space between the diaphragms will preferably be filled with liquid, preferably a viscous liquid. If the damping produced by the constructional form shown is too great, the second diaphragm 14 is omitted and the space between the diaphragm 1 and the plate 16 is augmented. The points set forth in reference to diaphragm 1 apply here also. Since the damping chamber between the perforated plate and the diaphragm 1 extends over the whole surface of the latter, all the vibrations executed by the diaphragm are considerably damped. This design of device also permits of the selection of certain forms of the vibrations executed by the diaphragm which are damped more than others, this being done by so shaping the perforated plate that it extends over a smaller or greater area of this vibrating diaphragm. An important point in connection with the mechanical damping means shown in Fig. 2 is that in order to obtain a sufficient damping, it is necessary to affect the medium adjoining the diaphragm to be damped, i. e. the damping chamber must abut against the member that it is intended to damp.

The various kinds of mechanical damping means are of equal importance, both for damping signal notes and for concomitant notes. But for economical reasons the attempt must always be made to obtain the necessary amount of damping by augmenting the useful damping or the damping of radiation when it is a question of damping vibrations of the apparatus or its parts that coincide with the note used for signaling. But if on the other hand undesired vibrations (concomitant notes, harmonics, transverse vibrations etc.) are to be destroyed, one of the illustrated forms of mechanical damping means will preferably be used.

We claim:

1. In submarine sound signaling apparatus including sound radiating means said apparatus having an aggregating damping decrement for the vibratory parts amounting to at least 0.3, the greater portion of the damping being radiation damping developed by said radiating means, whereby the apparatus is substantially prevented from giving an audible sound when it is subjected to the normally occurring undesired extraneous disturbances.

2. A submarine sound signaling apparatus having an aggregate damping decrement for the vibratory parts amounting to at least 0.3, whereby the apparatus is substantially prevented from giving an audible sound when it is subjected to the normally occurring undesired extraneous disturbances, said apparatus including a sound radiating diaphragm, the greater portion of the damping being radiation damping developed by the radiating diaphragm, said diaphragm having a diameter of at least ten centimeters.

3. A submarine sound signaling apparatus having an aggregate damping decrement for the vibratory parts amounting to at least 0.3, whereby the apparatus is substantially prevented from giving an audible sound when it is subjected to the normally occurring undesired extraneous disturbances, said apparatus including a sound radiating diaphragm, the greater portion of the damping being radiation damping developed by the radiating diaphragm, said diaphragm having a diameter of at least ten centimeters and formed of a material having low specific weight.

4. In a submarine sound signaling apparatus, a sound radiating diaphragm having a diameter of at least ten centimeters and formed of a material of low specific weight, and energy-converting means connected with said diaphragm, said apparatus having an aggregate damping decrement for the vibratory parts amounting to at least 0.3 whereby the apparatus is substantially prevented from giving an audible sound when it is subjected to the normally occurring undesired extraneous disturbances, the greater portion of said damping being radiation damping developed by said radiating diaphragm.

5. An apparatus according to claim 4, in which the energy-converting means is a microphone.

In testimony whereof we affix our signatures.

ALARD du BOIS-REYMOND.
WALTER HAHNEMANN.